US009528577B2

(12) United States Patent
Johnson

(10) Patent No.: US 9,528,577 B2
(45) Date of Patent: Dec. 27, 2016

(54) TIMING BELT SPACER TOOL

(75) Inventor: Scott Johnson, Narre Warren (AU)

(73) Assignee: Gates Corporation, Denver, CO (US)

( * ) Notice: Subject to any disclaimer, the term of this patent is extended or adjusted under 35 U.S.C. 154(b) by 149 days.

(21) Appl. No.: 14/394,250

(22) PCT Filed: Apr. 13, 2012

(86) PCT No.: PCT/US2012/033430
§ 371 (c)(1),
(2), (4) Date: Oct. 13, 2014

(87) PCT Pub. No.: WO2013/154572
PCT Pub. Date: Oct. 17, 2013

(65) Prior Publication Data
US 2015/0080159 A1  Mar. 19, 2015

(51) Int. Cl.
*F16H 7/24* (2006.01)
*F16H 7/18* (2006.01)
*F16H 7/08* (2006.01)
*F01L 1/02* (2006.01)
*F16H 7/02* (2006.01)

(52) U.S. Cl.
CPC .............. *F16H 7/24* (2013.01); *F01L 1/024* (2013.01); *F16H 7/02* (2013.01); *F16H 7/023* (2013.01); *F16H 7/08* (2013.01); *F16H 7/18* (2013.01); *Y10T 29/49826* (2015.01); *Y10T 29/53978* (2015.01)

(58) Field of Classification Search
CPC .............. F16H 7/24; F16H 7/18; F16H 7/02; F16H 7/023; F16H 7/08; F01L 1/024

USPC ......................................................... 474/130
See application file for complete search history.

(56) References Cited

U.S. PATENT DOCUMENTS

| D227,742 S | 7/1973 | Logsdon |
| 3,789,686 A * | 2/1974 | Vogelsang ............... F16H 7/02 474/114 |
| 4,007,928 A | 2/1977 | Doubt |
| D279,959 S | 8/1985 | Nimmo et al. |

(Continued)

FOREIGN PATENT DOCUMENTS

| JP | 2001323993 A | 11/2001 |
| JP | 2005221031 A | 8/2005 |

(Continued)

OTHER PUBLICATIONS

Russian Patent Office, International Preliminary Report on Patentability, and the Written Opinion of the International Searching Authority, date of issuance of the report Nov. 11, 2014.

(Continued)

*Primary Examiner* — William E Dondero
*Assistant Examiner* — Robert T Reese
(74) *Attorney, Agent, or Firm* — Paul N. Dunlap, Esq.; Jeffrey A. Thurnau, Esq.

(57) ABSTRACT

A timing belt spacer tool with an arcuate spacer portion of predetermined uniform thickness and an extension tab extending in an axial direction from the mid-section of the spacer portion. The extension tab may have a grip, which may be in the form of a protrusion, bulge, thickness variation, edging, bead, or the like. The opposing ends of the arcuate spacer portion may be flexible enough to be straightened in use but still return to their original arcuate shape.

8 Claims, 2 Drawing Sheets

(56) References Cited

U.S. PATENT DOCUMENTS

| | | | |
|---|---|---|---|
| D299,213 S | 1/1989 | Puntillo | |
| 4,850,314 A * | 7/1989 | Villa | F16H 7/24 123/90.31 |
| D344,449 S | 2/1994 | Ward | |
| 5,653,654 A * | 8/1997 | Davis | F16H 7/24 254/250 |
| D408,273 S | 4/1999 | Senninger | |
| 6,058,585 A | 5/2000 | Soleymani | |
| D438,453 S | 3/2001 | Nelson et al. | |
| 6,332,256 B1 | 12/2001 | Dawson | |
| 6,698,075 B1 | 3/2004 | Wu | |
| 7,047,610 B2 | 5/2006 | Dawson | |
| 7,055,230 B2 | 6/2006 | Wu | |
| D526,743 S | 8/2006 | Battista, III et al. | |
| 7,225,517 B2 | 6/2007 | Mitchell | |
| D609,084 S | 2/2010 | Traficante et al. | |
| 7,752,727 B2 | 7/2010 | Mitchell | |
| 8,307,527 B2 | 11/2012 | Huang | |
| 2004/0042848 A1 | 3/2004 | Dawson | |
| 2008/0060171 A1 | 3/2008 | Lindemann | |
| 2011/0105260 A1 * | 5/2011 | Vachal | A01D 34/76 474/119 |

FOREIGN PATENT DOCUMENTS

| | | |
|---|---|---|
| RU | 2200263 C2 | 10/2003 |
| SU | 1670250 A1 | 8/1981 |

OTHER PUBLICATIONS

Australian Government IP Australia, Patent Examination Report No. 1 Australian Patent Application No. 2012376828, dated Aug. 7, 2015.

Egon Von Ruville GmbH, Technical Brochure Belt Drive Components, Jul. 2011.

* cited by examiner

TIMING BELT SPACER TOOL

BACKGROUND OF THE INVENTION

Field of the Invention

This invention relates generally to a spacer tool for installing a tooth-jump-preventing belt guide in a timing belt drive system.

Description of the Prior Art

Various types of belt guides are used in synchronous belt drive systems to prevent the belt teeth from jumping or ratcheting on a pulley. The belt guide may have to be removed and reinstalled during belt replacement or during other maintenance procedures. The belt guide position may be adjustable. In some applications it may be difficult to properly position the belt guide. In some automotive timing drive applications, for example, it may difficult to see the gap between the belt guide and the backside of the belt. In particular for concave, curved belt guides, it may be difficult to maintain a proper gap between the belt guide and the backside of the belt over the entire arc of the belt guide. Contact between the belt and the belt guide at any point can lead to frictional heat during operation that can cause the failure of bearings, pulleys, belt covers, and/or tensioners, as well as the belt itself.

SUMMARY

The present invention is directed to tools and methods which provide for installing a curved belt guide with a proper gap between the belt guide and the belt.

The invention is directed to a timing belt spacer tool with an arcuate spacer portion of predetermined uniform thickness and an extension tab extending in an axial direction from the mid-section of the spacer portion. The extension tab may have a grip, which may be in the form of a protrusion, bulge, thickness variation, edging, bead, or the like. The opposing ends of the arcuate spacer portion may be flexible enough to be straightened in use but still return to their original arcuate shape. The tool may be integrally formed or molded of thermoplastic material.

The invention is also directed to a timing belt drive kit including an embodiment of the inventive timing belt spacer tool and one or more additional timing drive components which may be selected from a timing belt, an idler pulley, a tensioner, a belt guide, a bearing, a seal, another tool, and a fastener.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
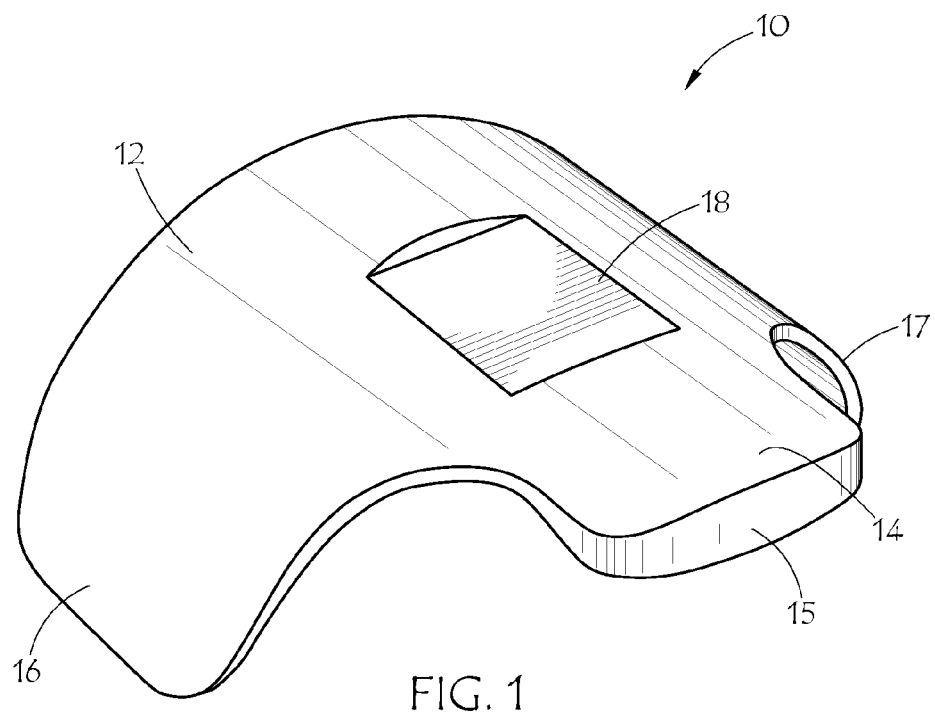
FIG. 1 is a front perspective view from above an embodiment of the invention.
Figure 2:
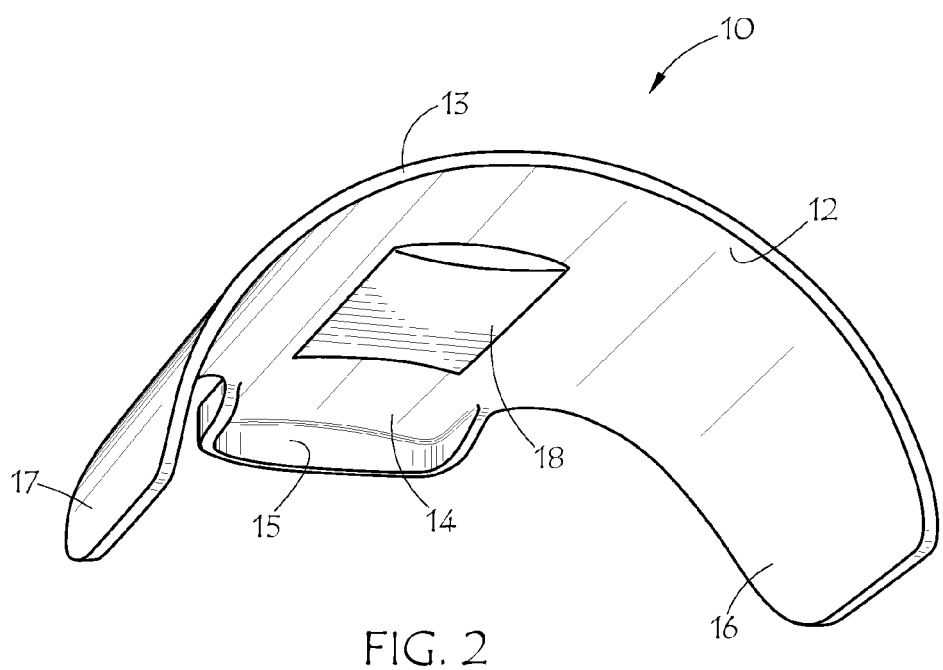
FIG. 2 is a rear perspective view from below an embodiment of the invention.

FIGS. 1 and 2 show an embodiment of the invention. Timing belt spacer tool 10 includes spacer 12 and extension tab 14. Spacer 12 is the arcuate spacer portion of the tool, and is in the form of a curved sheet of uniform, predetermined thickness 13. The curvature may be uniform over the entire arc from one end 16 to the other end 17. Extension tab 14 extends axially from the central portion or mid-section of the spacer and in the same plane. The extension tab 14 may have grip 15 to facilitate manually gripping, pulling, and/or pushing on the tool during use. Grip 15 may be a protrusion, bulge, thickness variation, edging, bead, or the like, such as the edging arrangement with recess underneath as shown in FIGS. 1 and 2. Other optional features may be included provided they do not interfere with the spacing function of the spacer 12. The embodiment of the FIGS. 1 and 2 has optional flat 18 formed in the top surface near where extension tab 14 joins spacer 12. Flat 18 may be used, for example, for displaying a label.

Figure 3:
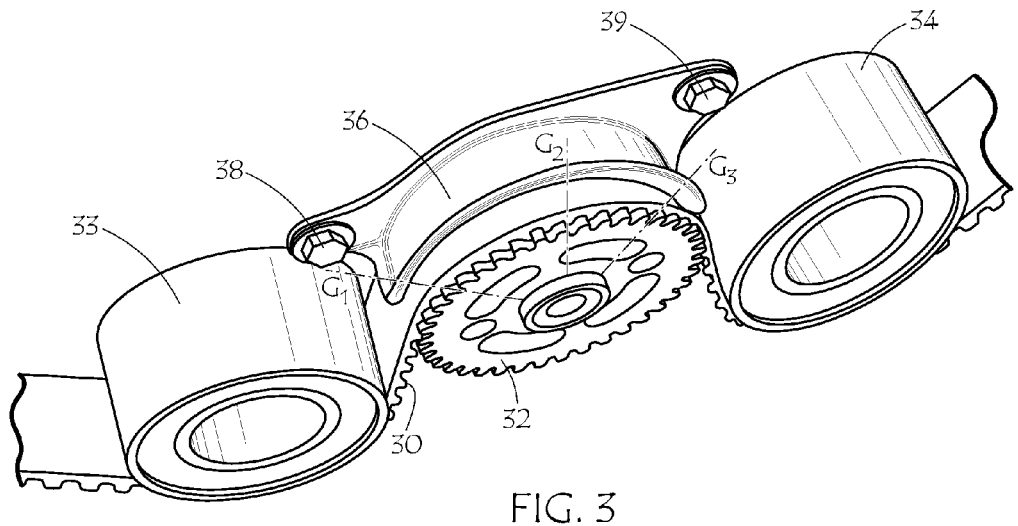
FIG. 3 is a perspective view of a portion of a timing belt drive system in which an embodiment of the invention may be used.

FIG. 3 is a perspective view of a portion of a timing belt drive system for an automotive engine in which an embodiment of the invention may be used. In FIG. 3, the drive system includes timing belt 30 wrapped partially on and engaged on crankshaft pulley 32, backside idlers 33 and 34, and belt guide 36. Belt guide 36 is concave on the inside portion adjacent the belt, so that it can be positioned with a substantially uniform curved gap over the wrapped portion of the belt on the crankshaft pulley. The purpose of belt guide 36 is to prevent tooth jumping which would change the timing between the belt and the crankshaft pulley. Belt guide 36 is attached to the engine (not shown) with two bolts 38 and 39. The bolts are somewhat smaller than their mounting holes in the belt guide to permit adjustment of the position of the belt guide to set the gap. The belt guide should not touch the back of belt 30. The belt guide should not be so close to the belt backside that belt movements cause regular contact between the belt and the belt guide. The gap is indicated at three positions in FIG. 3 as $G_1$, $G_2$, and $G_3$, all of which are preferable about the same. The gap must be less than the tooth height of the belt, but large enough that the belt does not contact the guide during normal operation. Thus, one typical automotive manufacturer's specification calls for a gap of 1±0.5 mm.

As discussed above, the typical timing drive on the front of an automotive engine is located down in an engine compartment of the auto body and is usually in close proximity to a fender, radiator, and/or other engine components. A mechanic looking down at the timing drive cannot directly see the gap between the belt guide and the belt. Moreover, the act of tightening the mounting bolts for the belt guide can cause the guide to move downward against the belt. As the bolts are tightened to secure the plate, the rotation of a bolt naturally pushes the plate down towards the belt. Even if only one bolt causes such movement, the guide touching the belt at any point can cause serious overheating and damage to the timing drive system, which in turn can cause extensive internal damage to engine components and result in very expensive repairs.

It may be noted here, that although car manufacture's repair specs have called for a gap or specified a clearance requirement between a belt guide and a belt, they have not explained how to obtain a suitable gap. A typical specification says to "check clearance between timing belt and timing belt guide" and then "tighten the bolts to specification." There is no warning about movement of the guide during tightening or the dangers of contact between guide and belt. Moreover, there has not been recognition in the industry that failure to maintain the proper gap causes any problems. For example, one repair guide published by MITCHELL REPAIR INFORMATION CO. LLC states, "This article addresses a rubbing mark on the back (flat) surface of the timing belt that is caused by the belt contacting the timing belt guide. This mark does not have any effect on the performance of the timing belt such as durability and no repairs should be attempted." The present applicants have discovered that, in fact, such rubbing may cause serious drive problems. The present invention can be easily used to prevent such rubbing.

Figure 4:
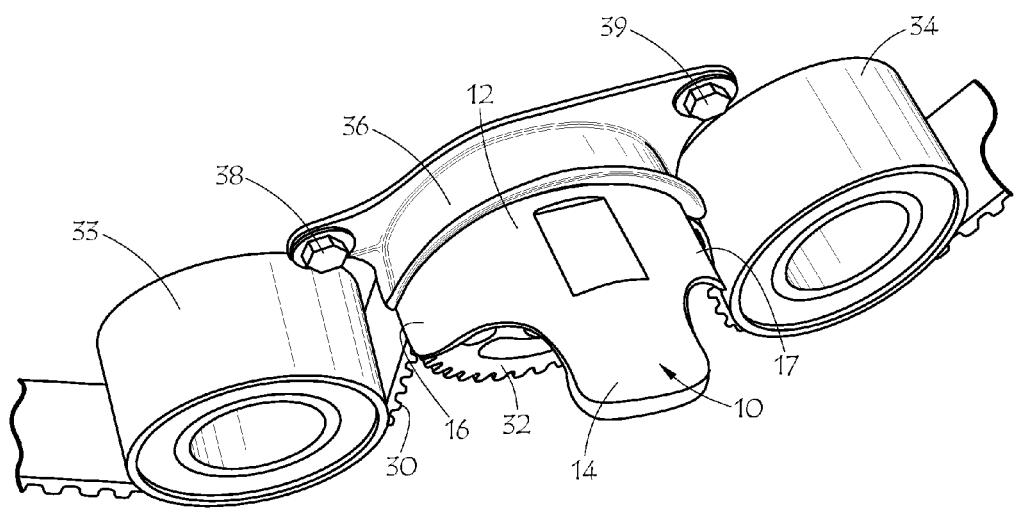
FIG. 4 shows an embodiment of the invention in use in the timing belt drive system of FIG. 3.

The present invention solves the problems associated with mounting the belt guide with the proper gap. FIG. 4 shows an embodiment of the invention in use in the system of FIG. 3. The drive system includes timing belt 30 engaged on crankshaft pulley 32 (also called a sprocket), backside idlers 33 and 34, and belt guide 36. Curved spacer 12 of timing belt spacer tool 10 is inserted between belt guide 36 and the back of belt 30. Ends 16 and 17 extend beyond guide 36. Spacer 12 maintains the proper gap over the entire arc of guide 36 as bolts 38 and 39 are tightened. As mentioned above, one typical automotive manufacturer's specification calls for a gap of 1±0.5 mm. For such an application the spacer thickness 13 of tool 10 may be 1 mm. Extension tab 14 protrudes from the drive, providing a ready handle or grip for the mechanic to use to insert and remove the tool. Another advantage of extension tab 14 is its high visibility, which prevents it from being forgotten and left on the belt drive.

It should be understood that the curved spacer has an axis which would also be substantially coincident with the axis of pulley 32 when in the tool is in use as shown in FIG. 4. Thus, "axially" refers to a direction parallel to this axis.

The amount of arc between the ends 16 and 17 of the spacer 12 may be advantageously a little more than the amount of arc in the guide plate with which the tool is to be used. Thus, the spacer tool may have a predetermined amount of arc between the ends 16 and 17 of the spacer 12. The amount of arc between the ends 16 and 17 of the spacer 12 may be advantageously a little less than the amount of arc of wrap of the timing belt on the pulley at which the tool is to be used. However, according to an embodiment of the invention, the spacer tool can be made of a flexible material so that even if the amount of arc between the ends 16 and 17 of the spacer 12 is somewhat greater than the amount of arc of wrap of the timing belt on the pulley at which the tool is to be used, the ends 16 and 17 may straighten to follow the contour of the timing belt when in contact with the timing belt, thus still providing the desired spacing function between the belt guide and the wrapped portion of the belt. Thus the opposing ends of the arcuate spacer portion of the tool may be flexible enough to be straightened in use but still return to their original arcuate shape.

The timing belt spacer tool may be made of any desired material which provides the necessary shape-ability, toughness in use, and flexibility of the ends 16 and 17. As non-limiting examples, the tool may be formed or integrally molded of a thermoplastic or plastic material, which may be reinforced, filled or toughened, such as a nylon plastic, a polyolefin plastic, or the like. The thickness 13 of the spacer 12 may be any desired predetermined thickness suitable for a particular spacing application.

The spacer tool of the invention may thus be used to ensure proper installation and correct clearance between a belt and a guide plate in a given belt drive application. The spacer tool is easy to use. The final step of replacing or installing a timing belt is to mount the belt guide (sometimes called a guide plate). After loosely attaching the belt guide retaining bolts the spacer tool is inserted between the belt and the guide. The guide may then make contact with the spacer at two or more points, or over its entire arc. The retaining bolts are then firmly tightened with the spacer tool still in place. The spacer tool is then removed leaving an ideal clearance between the belt guide and the belt.

According to an embodiment of the invention, the timing belt spacer tool may be incorporated in a kit. Each kit may include the timing belt spacer tool and one or more additional timing drive components selected from a timing belt, an idler pulley, a tensioner, a belt guide, a bearing, a seal, a fastener, another tool, and the like. The other tool in the kit may be one or more other tool useful for installing or replacing one or more components of the timing drive system, such as a wrench, puller, pulley holder, adjuster, or the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A timing belt spacer tool comprising an arcuate spacer portion of predetermined uniform thickness and an extension tab extending in an axial direction from the mid-section of the spacer portion; wherein the extension tab comprises a grip comprising a thickened edge.

2. The tool of claim 1 wherein the grip further comprises a recess defined by the thickened edge.

3. The tool of claim 1 integrally formed of thermoplastic material.

4. The tool of claim 1 wherein the opposing ends of the arcuate spacer portion are flexible enough to be straightened.

5. A timing belt drive kit comprising a timing belt spacer tool and one or more additional timing drive components selected from a timing belt, an idler pulley, a tensioner, a belt guide, a bearing, a seal, another tool, and a fastener; the timing belt spacer tool comprising an arcuate spacer portion of predetermined uniform thickness and an extension tab extending in an axial direction from the mid-section of the spacer portion.

6. The kit of claim 5 wherein the extension tab comprises a grip.

7. A method sequentially comprising:
installing a timing belt on a timing belt drive comprising a toothed pulley, said timing belt wrapped on a portion of said toothed pulley;
installing loosely a timing belt guide adjacent said portion of said toothed pulley;
inserting a timing belt spacer tool comprising an arcuate spacer portion of predetermined uniform thickness and an extension tab extending in an axial direction from the mid-section of the spacer portion; with said spacer portion inserted between said timing belt guide and the back of said timing belt on said portion of said toothed pulley;
tightening said timing belt guide;
removing said timing belt spacer tool.

8. The method of claim 7 wherein said extension tab comprises a grip.

* * * * *